US011493111B2

(12) United States Patent
Wu (10) Patent No.: US 11,493,111 B2
(45) Date of Patent: Nov. 8, 2022

(54) CHAIN PLATE

(71) Applicant: KMC Chain Industrial Co., Ltd., Tainan (TW)

(72) Inventor: Daniel Wu, Tainan (TW)

(73) Assignee: KMC CHAIN INDUSTRIAL CO., LTD., Tainan (TW)

( * ) Notice: Subject to any disclaimer, the term of this patent is extended or adjusted under 35 U.S.C. 154(b) by 372 days.

(21) Appl. No.: 16/867,922

(22) Filed: May 6, 2020

(65) Prior Publication Data

US 2021/0207684 A1 Jul. 8, 2021

(30) Foreign Application Priority Data

Jan. 6, 2020 (TW) .................................. 109100340

(51) Int. Cl.
*F16G 15/12* (2006.01)
*F16G 13/08* (2006.01)
*F16G 13/18* (2006.01)

(52) U.S. Cl.
CPC ............. *F16G 15/12* (2013.01); *F16G 13/08* (2013.01); *F16G 13/18* (2013.01)

(58) Field of Classification Search
CPC .......... F16G 15/12; F16G 13/02; F16G 13/08; F16G 13/18
USPC ................................... 474/213, 214, 209, 206
See application file for complete search history.

(56) References Cited

U.S. PATENT DOCUMENTS

| | | | |
|---|---|---|---|
| 4,265,134 A * | 5/1981 | Dupoyet | F16G 13/06 59/8 |
| 7,325,391 B1 * | 2/2008 | Oishi | F16G 13/06 59/5 |
| 8,734,280 B2 * | 5/2014 | Oishi | F16G 13/06 474/230 |
| 9,303,726 B2 * | 4/2016 | Fukumori | F16G 13/06 |
| 9,541,159 B2 * | 1/2017 | Wang | F16G 13/06 |
| 10,618,598 B2 * | 4/2020 | Fukumori | F16G 15/12 |

(Continued)

FOREIGN PATENT DOCUMENTS

| | | |
|---|---|---|
| EP | 3348859 A1 | 7/2018 |
| TW | 201538870 A | 10/2015 |
| TW | 201910663 A | 3/2019 |

OTHER PUBLICATIONS

Search Report issued to European counterpart application No. 20173522.2 by the EPO dated Oct. 30, 2020.

(Continued)

*Primary Examiner* — Michael R Mansen
*Assistant Examiner* — Mark K Buse
(74) *Attorney, Agent, or Firm* — Kirton McConkie; Evan R. Witt (57) ABSTRACT

A chain plate includes two end segments, and an intermediate segment between the end segments. One of the end segments has an extension portion extending away from a rod hole of the end segment in a lengthwise direction. A distance from a center of the rod hole to an edge of the end segment in the lengthwise direction is greater than a distance from the center of the rod hole to an edge of the end segment in a widthwise direction. An inner surface of the chain plate has a first inclined region corresponding to a peripheral region of the end segment, and a second inclined region corresponding to the extension portion and between the first inclined region and the rod hole. The intermediate segment is formed with a recess.

9 Claims, 12 Drawing Sheets

(56) References Cited

U.S. PATENT DOCUMENTS

| | | | | |
|---|---|---|---|---|
| 2015/0308542 A1* | 10/2015 | Fukumori | ............... | F16G 15/12 |
| | | | | 474/230 |
| 2017/0067535 A1* | 3/2017 | Fukumori | ............... | F16G 13/06 |
| 2018/0201341 A1* | 7/2018 | Wu | ..................... | F16G 13/06 |
| 2019/0048973 A1* | 2/2019 | Fukumori | ............... | F16H 55/30 |
| 2019/0048974 A1* | 2/2019 | Fukumori | ................ | B62M 9/00 |
| 2019/0100278 A1* | 4/2019 | Fukumori | ................ | B62M 9/00 |

OTHER PUBLICATIONS

Search Report appended to an Office Action issued to Taiwanese counterpart application No. 109100340 by the TIPO dated Sep. 25, 2020, with an English translation thereof.

* cited by examiner

CHAIN PLATE

CROSS-REFERENCE TO RELATED APPLICATION

This application claims priority to Taiwanese Invention Patent Application No. 109100340, filed on Jan. 6, 2020.

FIELD

The disclosure relates to a chain plate, and more particularly to an inner chain plate.

BACKGROUND

Figure 1:
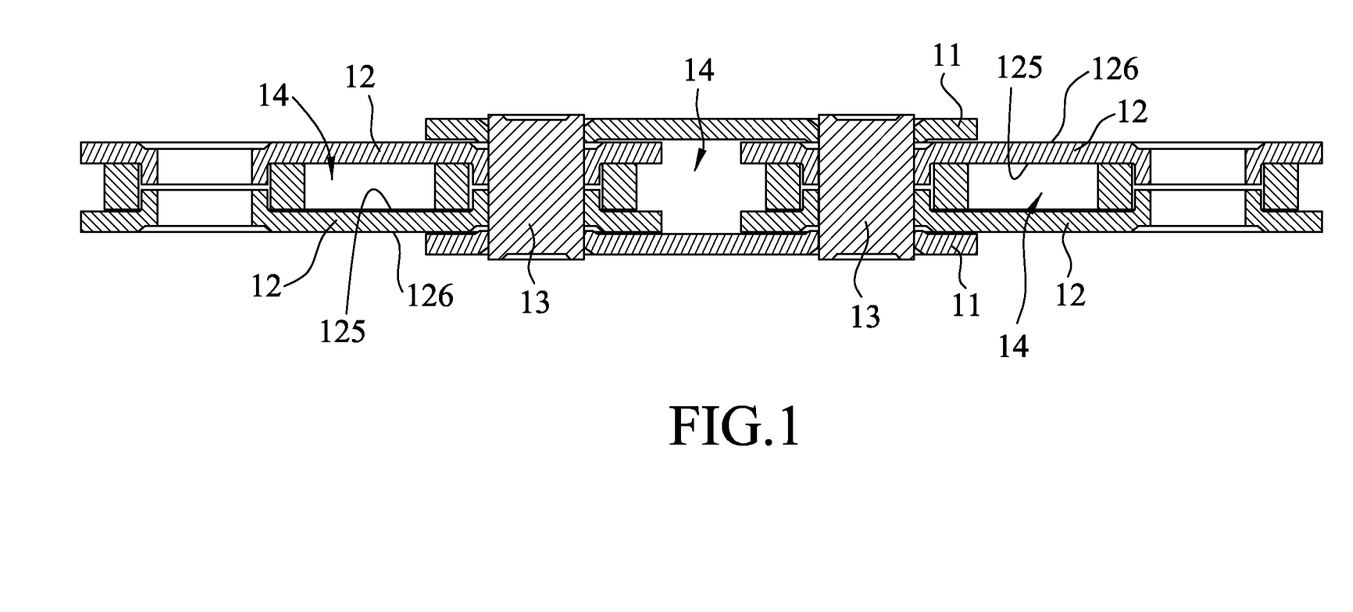
FIG. 1 is a cross-sectional view of a conventional chain.

Referring to FIG. 1, a conventional chain includes a plurality of outer chain plates 11, a plurality of inner chain plates 12, and a plurality of connecting rod 13 each interconnecting two of the outer chain plates 11 and two of the inner chain plates 12. The outer chain plates 11 and the inner chain plates 12 cooperatively define a plurality of engaging spaces 14 allowing entrance of teeth of a sprocket (not shown) thereinto.

Figure 2:
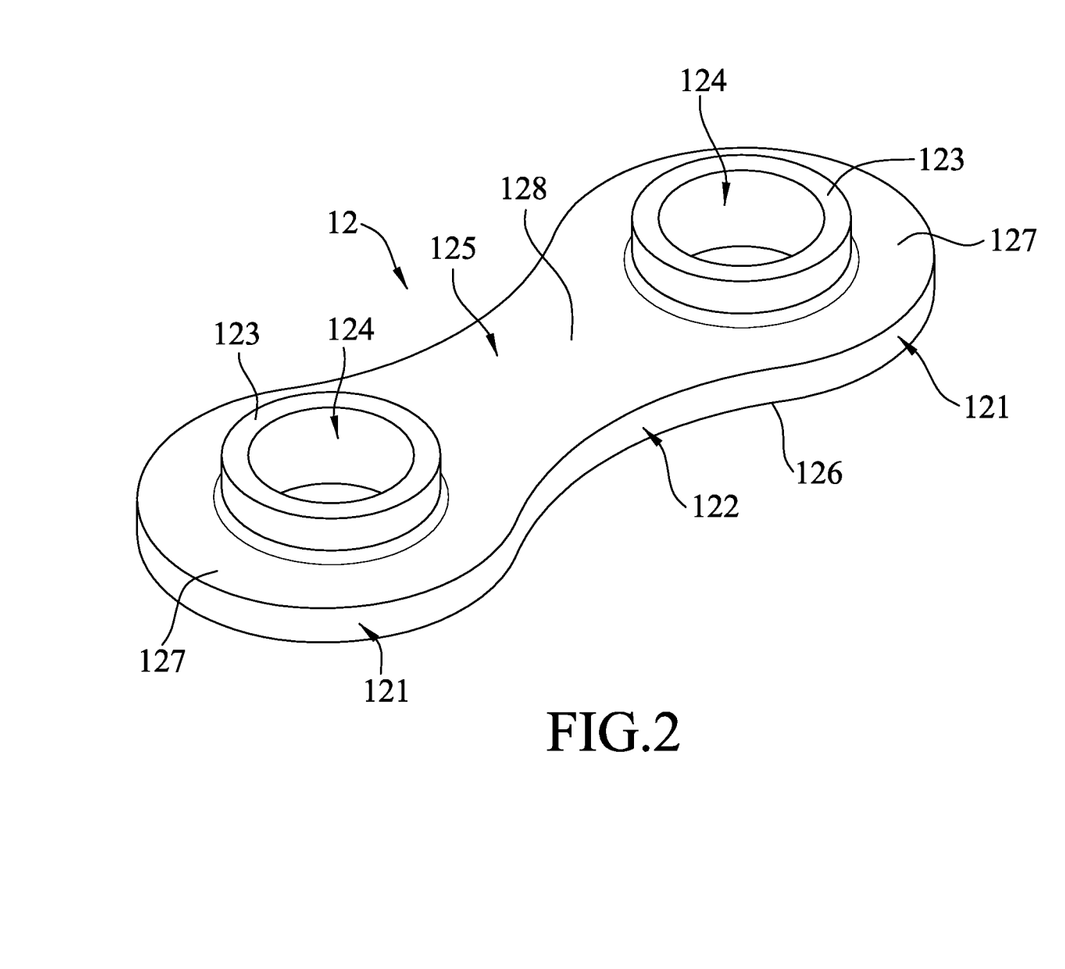
FIG. 2 is a perspective view of a conventional inner chain plate.

Further referring to FIG. 2, each inner chain plate 12 includes two end segments 121 spaced apart from each other in a lengthwise direction of the inner chain plate 12, an intermediate segment 122 disposed between and connected to the end segments 121, and two protruding rings 123 protruding respectively from the end segments 121. Each of the end segments 121 has a rod hole 124 that is formed through the end segment 121. Each of the protruding rings 123 surrounds the rod hole 124 of a corresponding one of the end segments 121.

The inner chain plate 12 has an inner surface 125 and an outer surface 126 that are opposite to each other in a thicknesswise direction of the inner chain plate 12. The inner surface 125 has two circular regions 127 corresponding respectively to the end segments 121 and surrounding the protruding rings 123, respectively. The inner surface 125 further has an intermediate region 128 corresponding to the intermediate segment 122 and disposed between and connected to the circular regions 127. The circular regions 127 and the intermediate region 128 of the inner surface 126 are all planar surfaces, such that the teeth of the sprocket may not enter the engaging spaces 14 smoothly and even baffled during entrance into the engaging spaces 14.

Taiwanese Patent Application No. 106114820 provides a conventional bicycle chain. Taiwanese Patent Application Nos. 095114730 and 106101166, which were filed by the applicant, also provide conventional chain plates.

SUMMARY

Therefore, an object of the disclosure is to provide a chain plate that can alleviate at least one of the drawbacks of the prior art.

The chain plate includes two end segments spaced apart from each other in a lengthwise direction, and an intermediate segment disposed between and connected to the end segments.

Each of the end segments has a rod hole having a center, and one of the end segments further has an extension portion extending away from the center of the rod hole of the one of the end segments in the lengthwise direction. A first distance from the center of the rod hole of the one of the end segments to an edge of the one of the end segments in the lengthwise direction is greater than a second distance from the center of the rod hole of the one of the end segments to an edge of the one of the end segments in a widthwise direction.

The chain plate has an inner surface and an outer surface that are opposite to each other in a thicknesswise direction. The inner surface has a first inclined region corresponding to a peripheral region of the one of the end segments, and a second inclined region corresponding to the extension portion and between the first inclined region and the rod hole of the one of the end segments. The first inclined region and the second inclined region are inclined toward the outer surface.

The intermediate segment is formed, at the inner surface, with a recess that is recessed in the thicknesswise direction toward the outer surface and that has two parallel edges extending in the widthwise direction and spaced apart from each other in the lengthwise direction.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
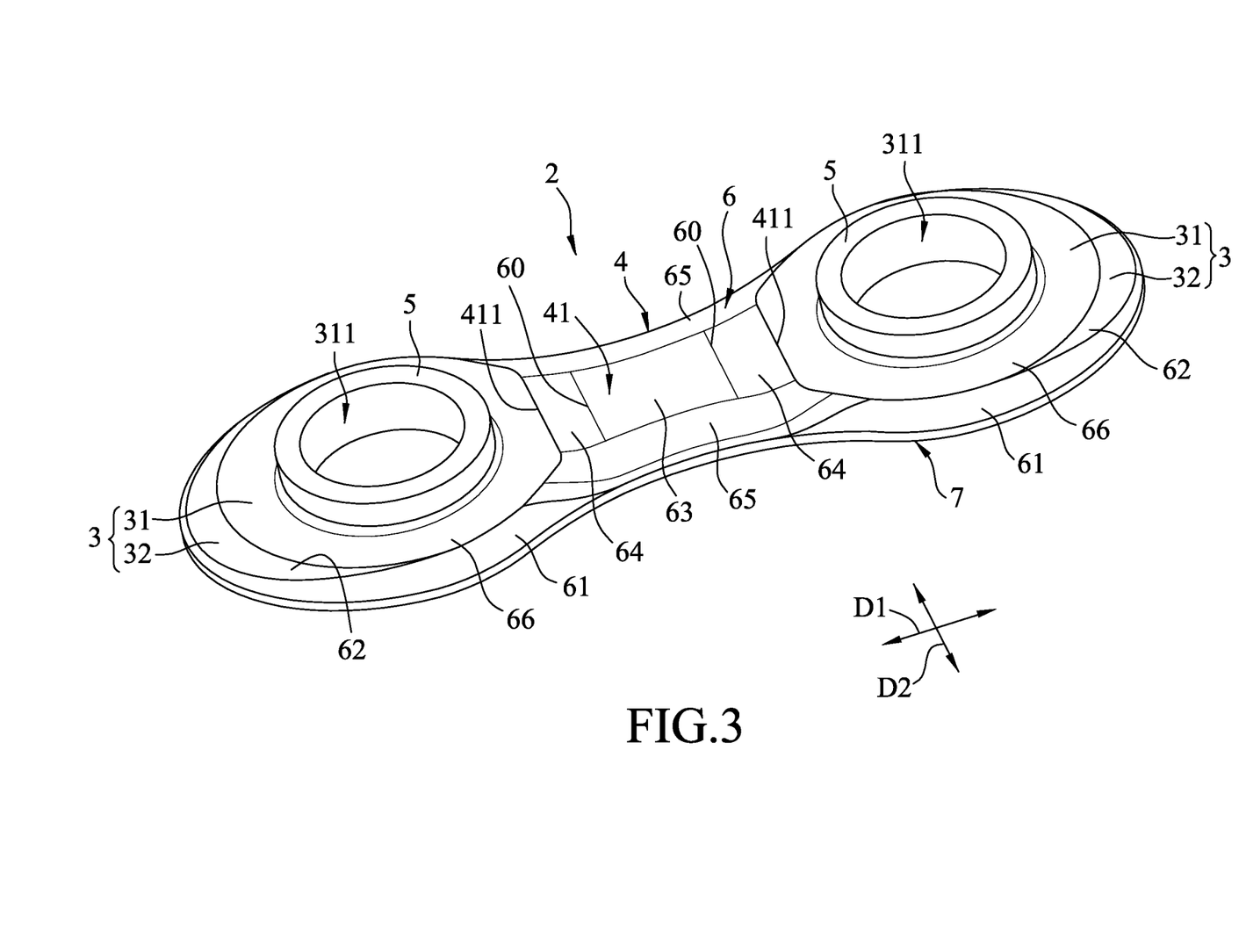
FIG. 3 is a perspective view illustrating an embodiment of an inner chain plate according to this disclosure.
Figure 4:
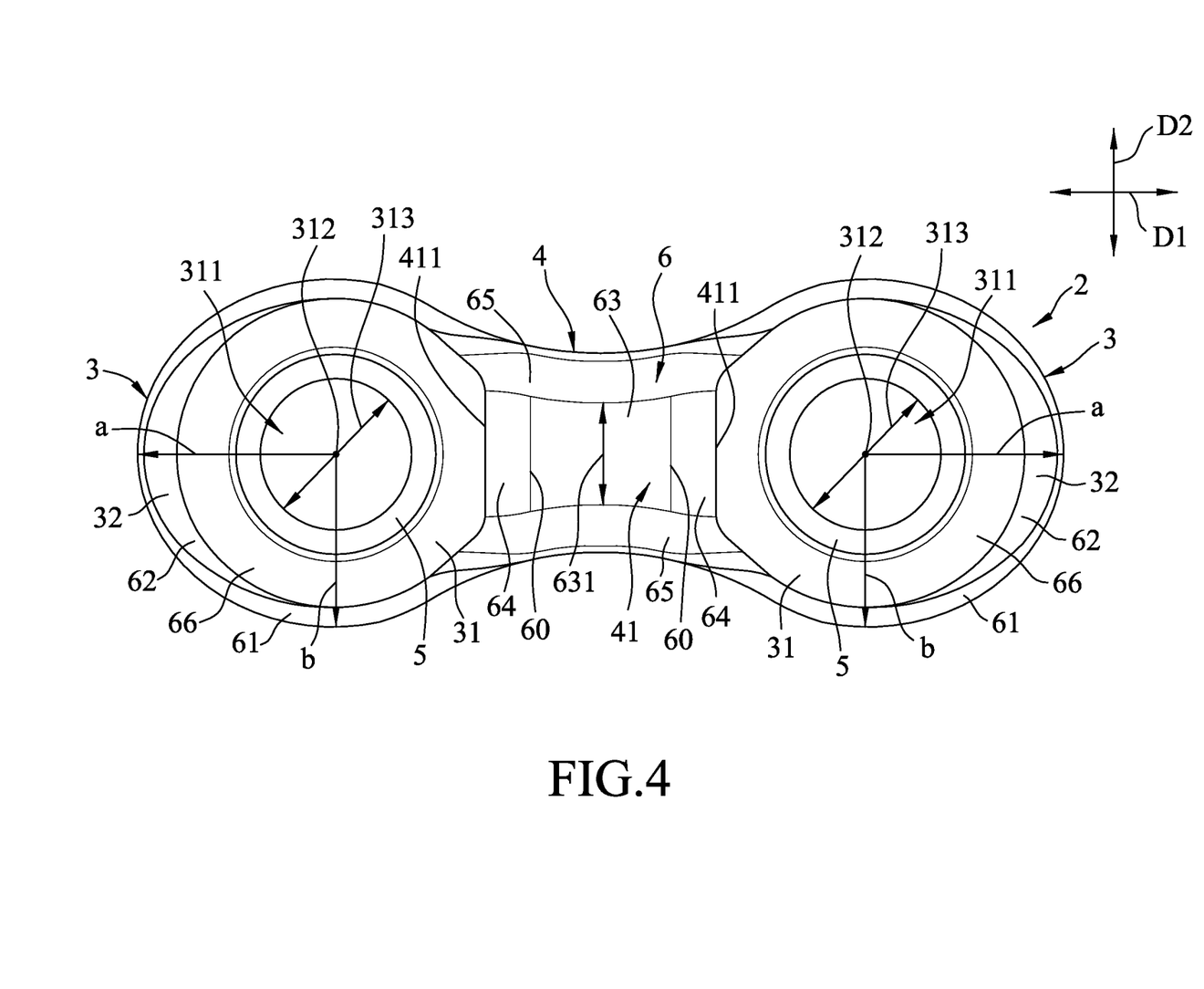
FIG. 4 is a top view of the inner chain plate of FIG. 3.
Figure 5:
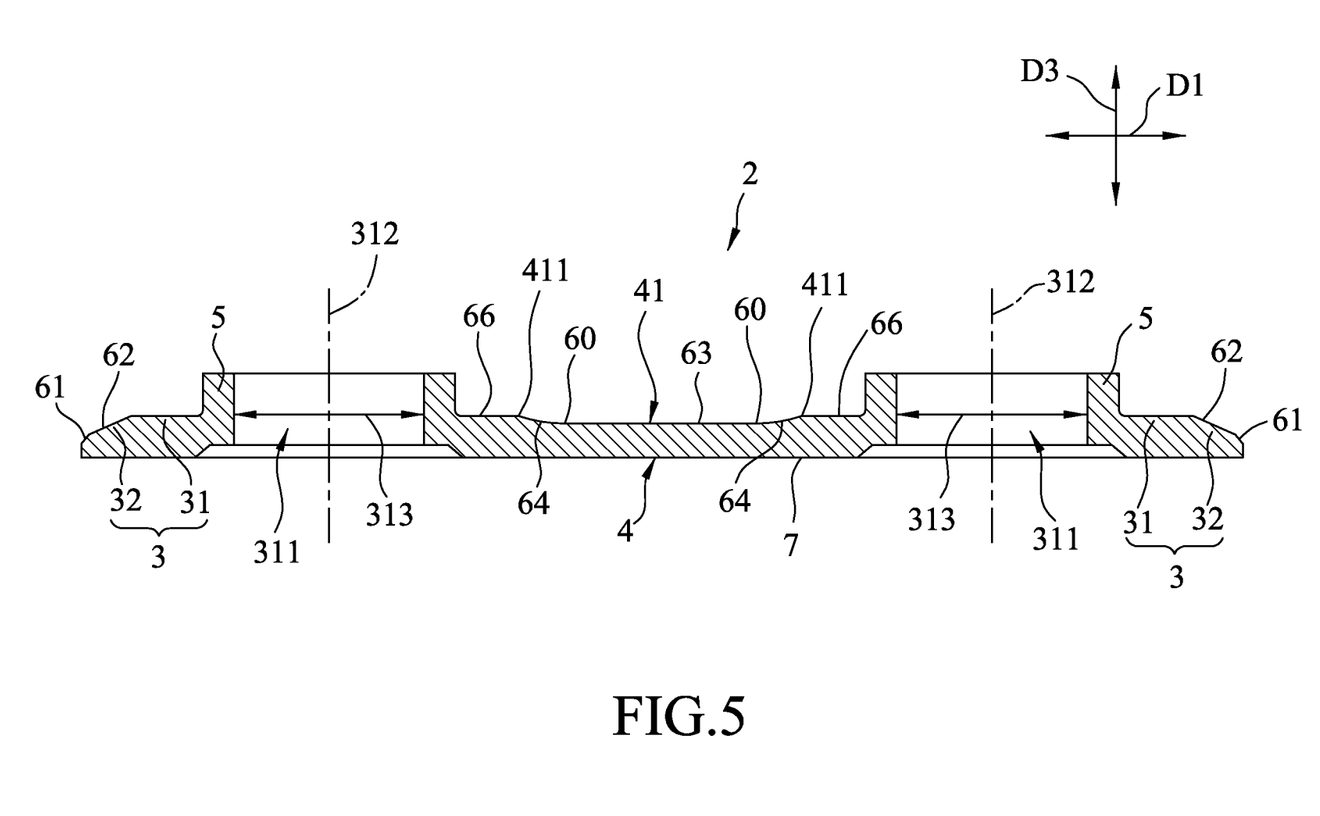
FIG. 5 is a cross-sectional view of the inner chain plate of FIG. 3 taken in a lengthwise direction of the inner chain plate.
Figure 8:
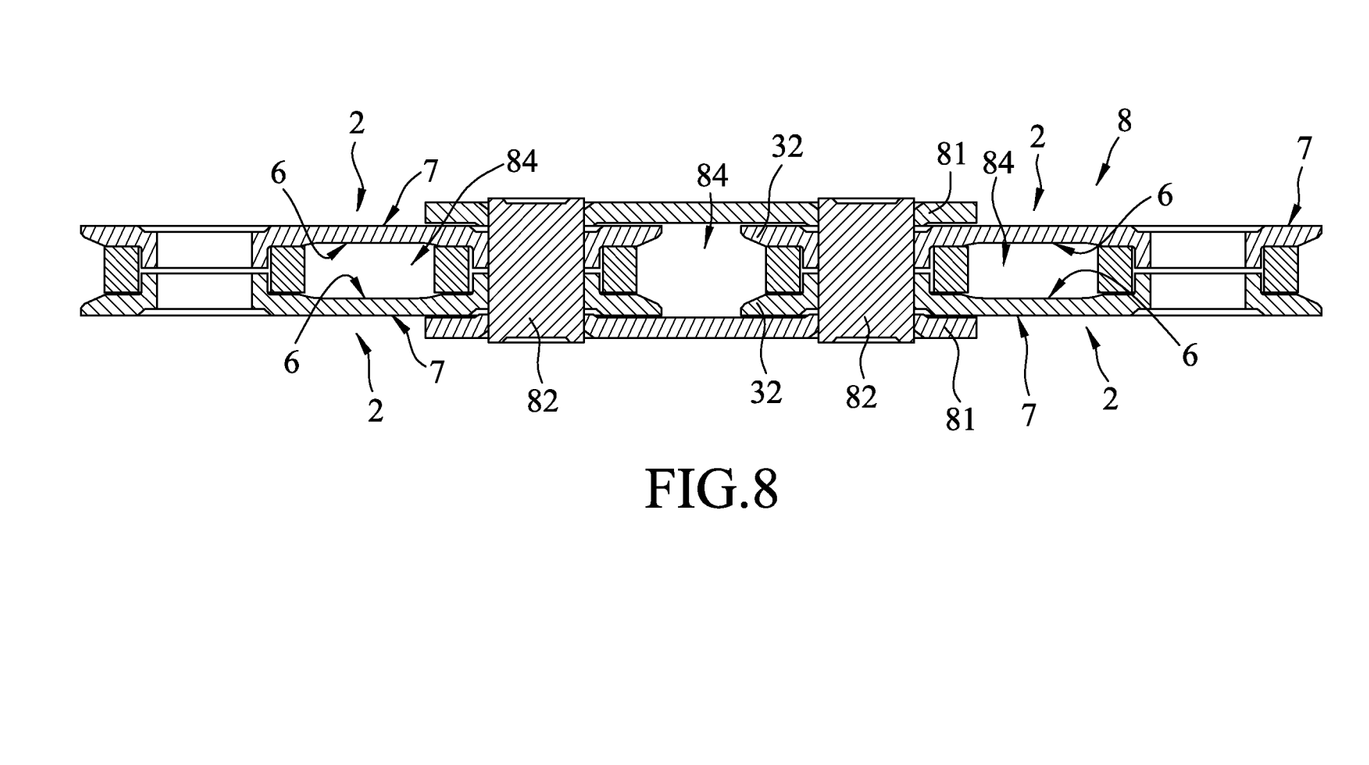
FIG. 8 is a cross-sectional view illustrating a chain including the inner chain plates of FIG. 3.

Referring to FIGS. 3 to 5, an embodiment of a chain plate 2 can be used as an inner chain plate of a chain 8 (see FIG. 8). The chain 8 includes a plurality of the chain plates 2 (inner chain plates), a plurality of outer chain plates 81, and a plurality of connecting rods 82. Each of the connecting rods 82 interconnects two outer chain plates 81 and two inner chain plates 2 so as to make the outer chain plates 81 and the inner chain plates 2 constitute the chain 8. The chain 8 has a plurality of engaging spaces 84 defined by adjacent two of the inner chain plates 2, or by adjacent two of the outer chain plates 81.

The chain plate 2 includes two end segments 3 spaced apart from each other in a lengthwise direction (D1) of the chain plate 2, an intermediate segment 4 disposed between and connected to the end segments 3, and two protruding rings 5 protruding respectively from the end segments 3.

Each of the end segments 3 is in a shape of a semi-ellipse, and has a hole portion 31 and an extension portion 32. Referring specifically to FIGS. 4 and 5, the hole portion 31 is formed with a rod hole 311 that has a central axis 312 extending in a thicknesswise direction (D3) of the chain plate 2, that is substantially cylindrical, and that extends through the hole portion 31 along the central axis 312 in the thicknesswise direction (D3). The extension portion 32 extends away from the central axis 312 of the rod hole 311 in the lengthwise direction (D1). A first distance (a) from the central axis 312 of the rod hole 311 to an edge of the end segment 3 in the lengthwise direction (D1) is longer than a second distance (b) from the central axis 312 of the rod hole 311 to an edge of the end segment 3 in a widthwise direction (D2).

The protruding rings 5 protrude respectively from the hole portions 31 of the end segments (3) in the thicknesswise direction (D3), and surround respectively the rod holes 311 of the end segments 3. That is to say, for each of the protruding rings 5, a center of the protruding ring 5 is on the central axis 312 of the rod hole 311 of a corresponding one of the hole portions 31.

Figure 6:
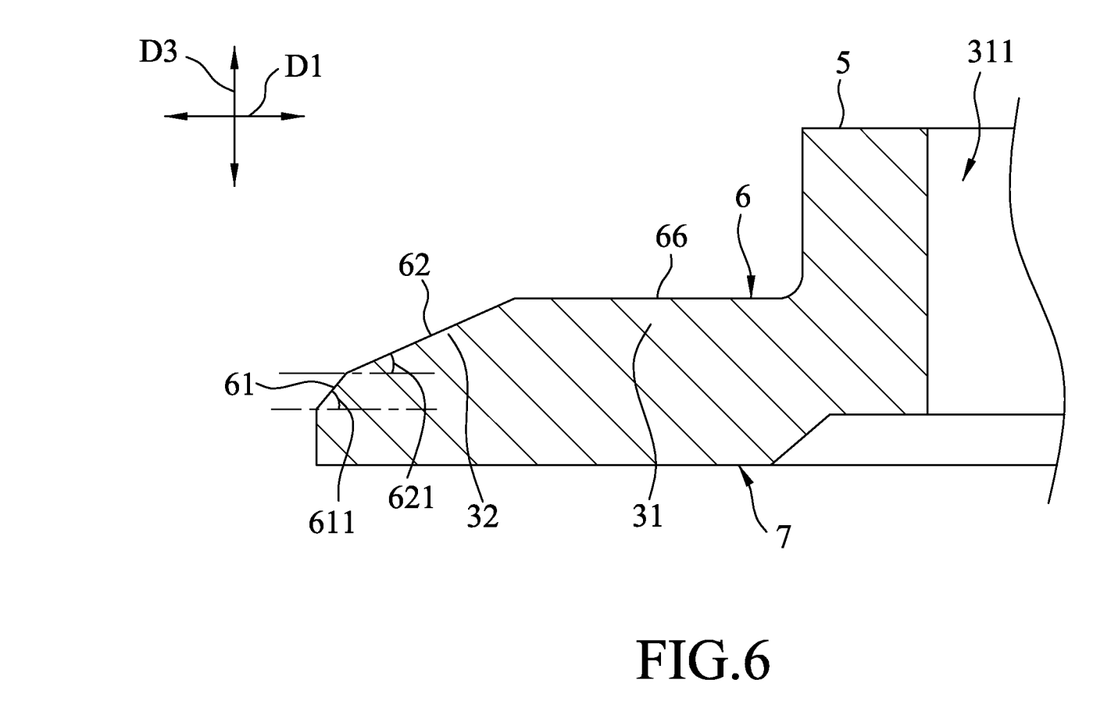
FIG. 6 is an enlarged cross-sectional view illustrating a portion of the chain plate of FIG. 3.
Figure 7:
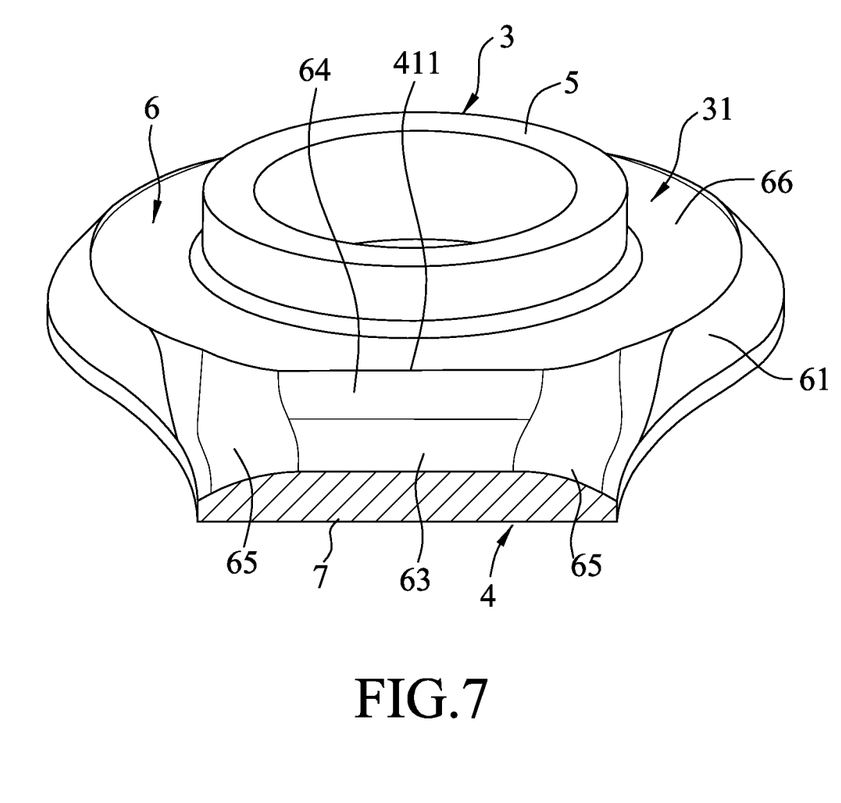
FIG. 7 is a cross-sectional view of the inner chain plate of FIG. 3 taken in a widthwise direction of the inner chain plate.

Further referring to FIGS. 6 and 7, in terms of a surface contour of the chain plate 2, the chain plate 2 has an inner surface 6 and an outer surface 7 that are opposite to each other in the thicknesswise direction (D3). It should be noted that the inner surface 6 is a surface of the chain plate 2 (inner chain plate) facing another chain plate 2 when these two chain plates 2 are connected together by the connecting rod 82 to form the chain 8 (see FIG. 8), and the inner surfaces 6 of these two chain plates 2 cooperatively define one of the engaging spaces 84.

The intermediate segment 4 is formed, at the inner surface 6, with a recess 41 that is recessed in the thicknesswise direction (D3) toward the outer surface 7. The recess 41 has two parallel edges 411 extending in the widthwise direction (D2) and spaced apart from each other in the lengthwise direction (D1).

The inner surface 6 has two first inclined regions 61, two second inclined regions 62, a planar region 63, two curved regions 64, two third inclined regions 65 and two circular regions 66. One of the first inclined regions 61, one of the second inclined regions 62 and one of the circular regions 66 correspond to a corresponding one of the end segment 3. The planar region 63, the curved regions 64 and the third inclined regions 65 correspond to the intermediate segment 4. Since the end segments 3 are substantially the same, a detailed description of the surface contour of only one of the end segments 3 (i.e., the first inclined region 61, the second inclined region 62 and the circular region 66) is provided for the sake of brevity.

The first inclined region 61 corresponds to the peripheral region of the end segment 3, the second inclined region 62 corresponds to the extension portion 32, and the circular region 66 corresponds to the hole portion 31 and surrounds the rod hole 311. Specifically, the first inclined region 61 extends radially from a circular periphery of the circular region 66, and is inclined toward the outer surface 7 to define a peripheral chamfer on the end segment 3. The second inclined region 62 is disposed between the first inclined region 61 and the rod hole 311, and more particularly between the first inclined region 61 and the hole portion 31. The second inclined region 62 extends from the circular periphery of the circular region 66 away from the rod hole 311 toward an edge of the extension portion 32 in the lengthwise direction (D1), and is inclined toward the outer surface 7 to define a chamfer on the extension portion 32. In this embodiment, the second inclined region 62 (i.e., the extension portion 32) is in a crescent shape and is curved along a periphery of the rod hole 311. In this embodiment, a first angle 611 of the first inclined region 61 relative to the outer surface 7 is greater than a second angle 621 of the second inclined region 62 relative to the outer surface 7 (see FIG. 6). In other embodiments, the second angle 621 of the second inclined region 62 may be varied according to design requirement, and the shape and size of the extension portion 32 may be varied accordingly.

The third inclined regions 65 are spaced apart from each other in the widthwise direction (D2) and extend in the lengthwise direction (D1), and are adjacent respectively to two sides of the recess 41 that are opposite to each other in the widthwise direction (D2). The third inclined regions 65 are inclined toward the outer surface 7 to respectively define two chamfered edges on the intermediate segment 4.

The planar region 63 is disposed between the third inclined regions 65, defines a bottom of the recess 41, and has a width 631 in the widthwise direction (D2) not greater than two thirds of a diameter 313 of each of the rod holes 311. The curved regions 64 extend in the widthwise direction (D2), and define two side portions of the recess 41 that are opposite to each other in the lengthwise direction (D1). Each of the curved regions 64 is disposed between the planar region 63 and a corresponding one of the circular regions 66, and is connected to the corresponding one of the circular regions 66 at a corresponding one of the edges 411 of the recess 41. Specifically, each of the curved regions 64 is connected to the planar region 63 with a conjunction line 60 therebetween. The conjunction lines 60 of the curved regions 64 extend in the widthwise direction (D2) and are spaced apart from each other in the lengthwise direction (D1). The conjunction lines 60 and the edges 411 are parallel to one another.

Figure 9:
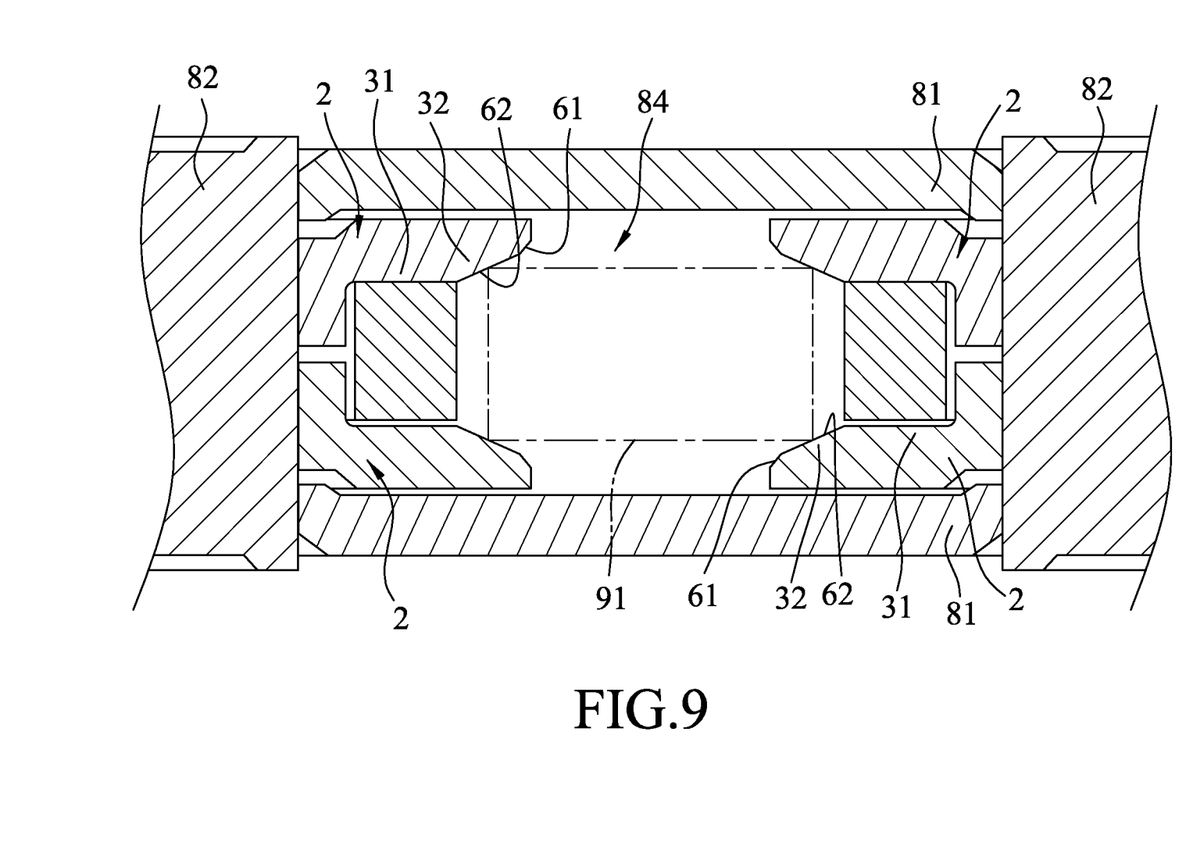
FIG. 9 is an enlarged cross-sectional view illustrating a portion of the chain of FIG. 8.

Referring to FIGS. 3, 8 and 9, by virtue of the extension portions 32, the chain plate 2 is elongated in the lengthwise direction (D1) without changing positions of the rod holes 311. As a result, the extension portions 32 extend more into the engaging space 84 defined by adjacent two of the outer chain plates 81. When the chain 8 rotates around a sprocket, a tooth 91 of the sprocket (only one is illustrated by a dash-line box in FIG. 9) may come into contact with the extension portions 32 early in entrance of the tooth 91 into the engaging space 84, so that the extension portions 32 may guide the tooth 91 to enter into the engaging space 84 smoothly and stably. Therefore, the chain 8 may smoothly engage the sprocket early in the rotation of the chain 8, alleviating unstable engagement between the chain 8 and the sprocket. Furthermore, by virtue of the second inclined regions 62, a contact area between each chain plate 2 and the tooth 91 is increased, reducing noise attributed to the rotation of the chain 8.

It should be noted that the smaller the second angle 621 of the second inclined region 62, the longer the second inclined region 62 in the lengthwise direction (D1), which facilitates the entrance of the tooth 91 into the engaging space 84 and the rotation of the chain 8 around the sprocket. Besides, the smaller the width 631 of the planar region 63 in the widthwise direction (D2), the bigger the areas of the third inclined regions 65, which also facilitates the entrance of the tooth 91 into the engaging space 84. For example, in a case where the chain 8 is used as a bicycle chain in a bicycle and surrounds a freewheel and a sprocket that are arranged in a front-rear direction, shifting gears may be relatively smooth, and interference in the chain 8 engaging the rear freewheel and the front sprocket can be reduced even when a chainline of the chain 8 is greatest (i.e., when the chain 8 engages a greatest toothed-wheel of the sprocket and a greatest toothed-wheel of the freewheel, or engages a smallest toothed-wheel of the sprocket and a smallest toothed-wheel of the freewheel).

Figure 10:
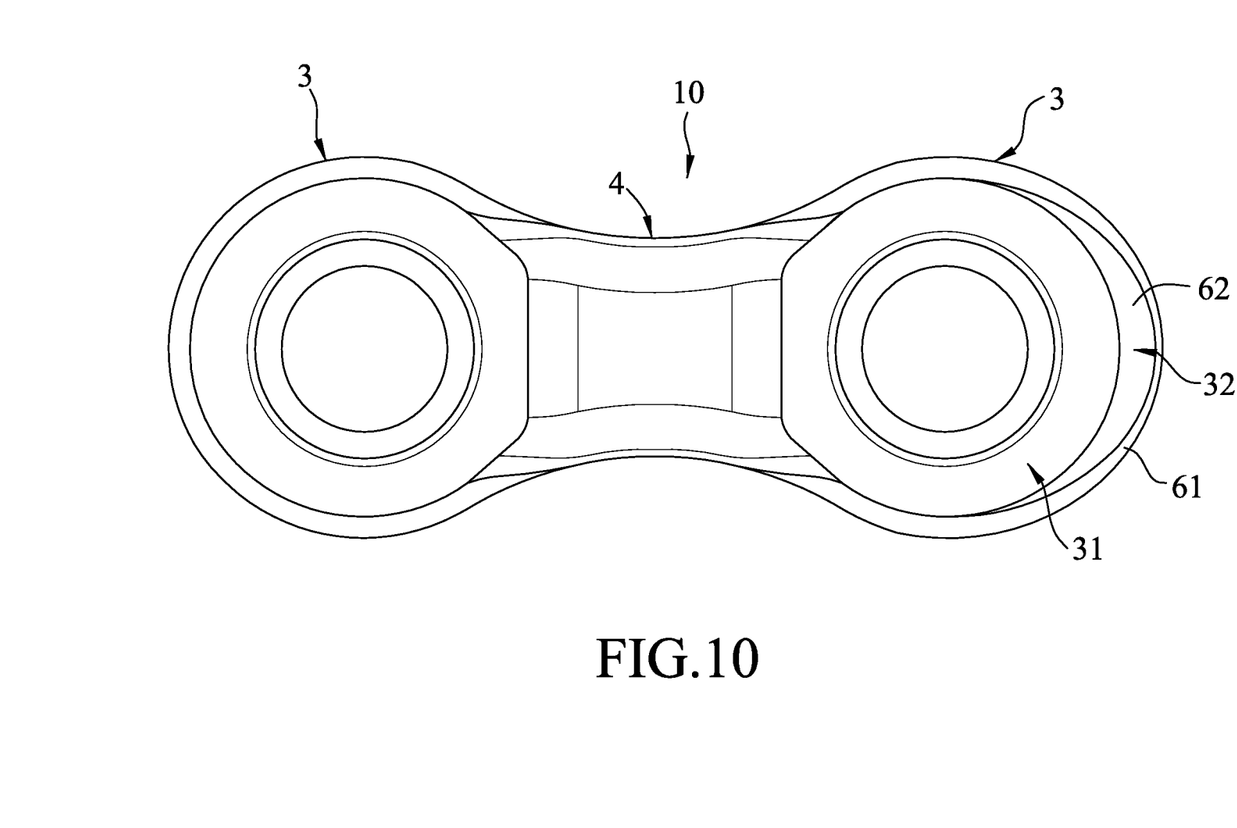
FIG. 10 is a top view illustrating another embodiment of an inner chain plate according to this disclosure.

Referring to FIG. 10, another embodiment of the chain plate 10 of this disclosure is similar to the embodiment of the chain plate 2 of FIG. 3. In this embodiment, only one of the end segments of the chain plate 10 has the extension portion 32. Also, the inner surface 6 only has one first inclined region 61 and one second inclined region 62 that correspond to the end segment 3 having the extension portion 32.

Figure 11:
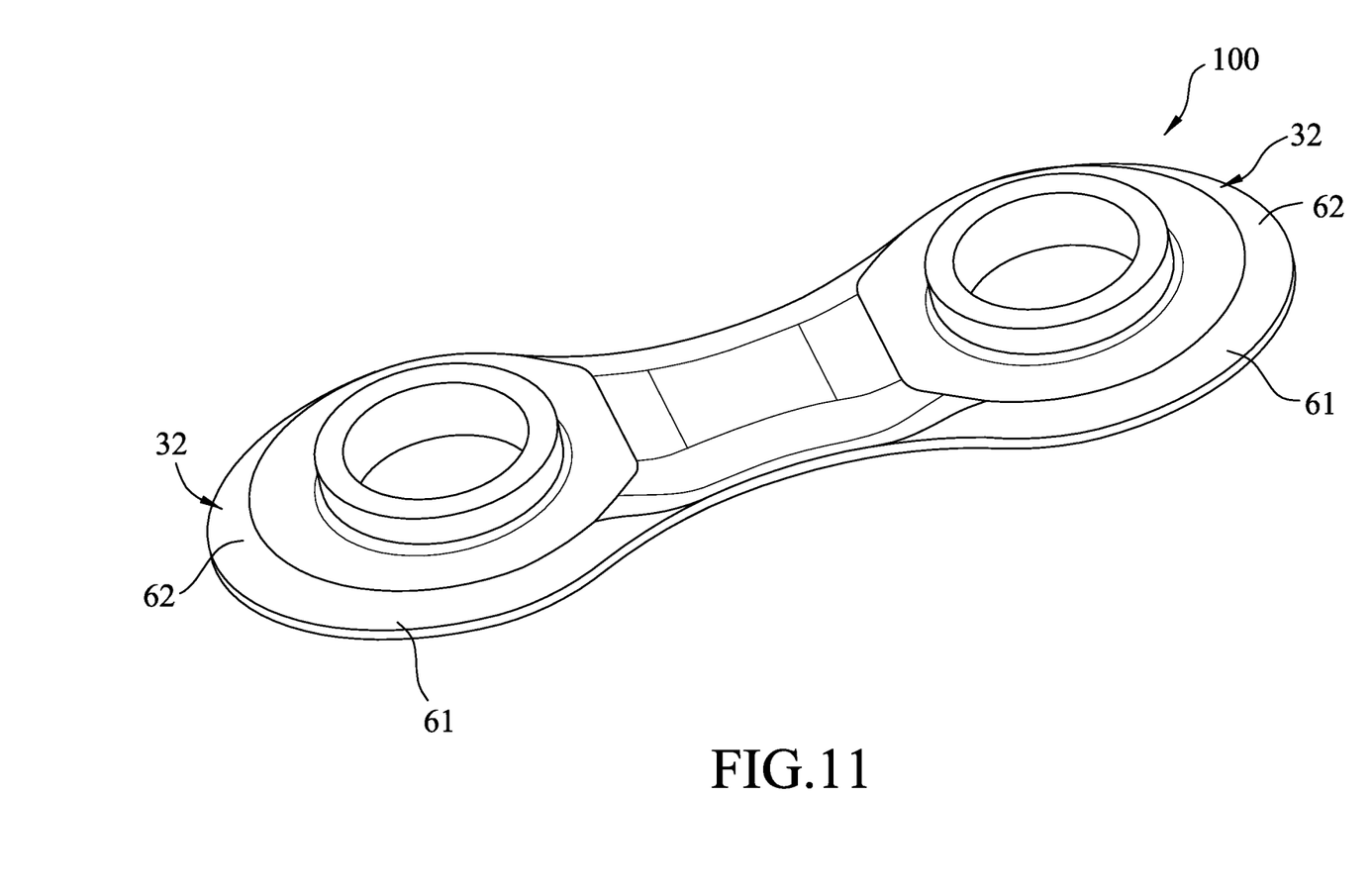
FIG. 11 is a perspective view illustrating yet another embodiment of an inner chain plate according to this disclosure.
Figure 12:
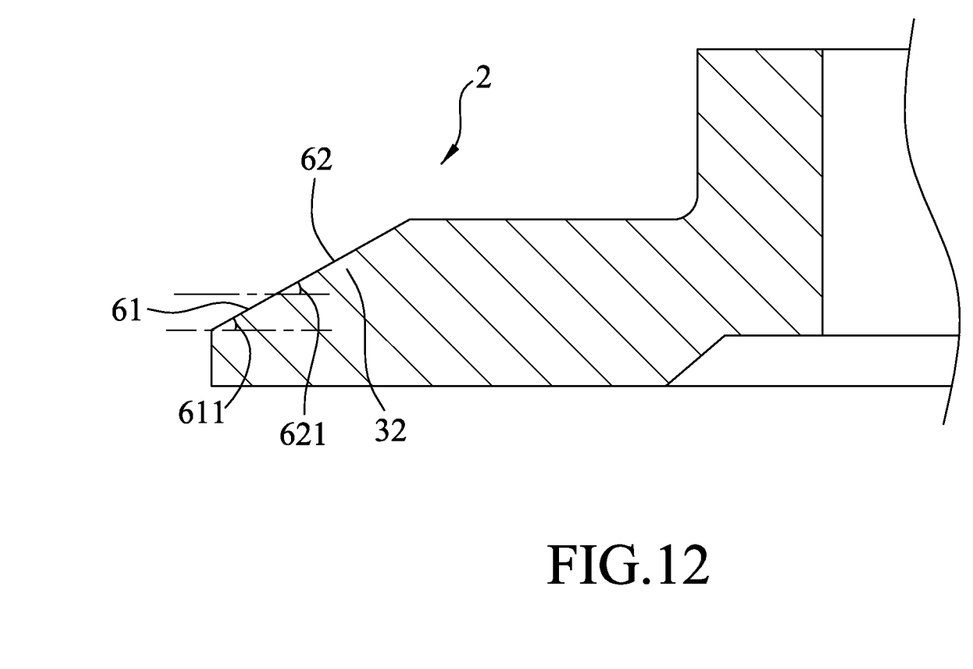
FIG. 12 is an enlarged cross-sectional view illustrating a portion of the chain plate of FIG. 11.

Referring to FIGS. 11 and 12, yet another embodiment of the chain plate 100 of this disclosure is similar to the embodiment of the chain plate 2 of FIG. 3. In this embodiment, the first angle 611 of the first inclined region 61 relative to the outer surface 7 is substantially equal to the second angle 621 of the second inclined region 62 relative to the outer surface 7. That is to say, the first inclined region 61 and the second inclined region 62 are integrated as one inclined region, and cooperatively define the peripheral chamfer on the end segment 3.

To sum up, by virtue of the extension portion 32 and the inner surface 6 of the chain plate 2 having the first and second inclined regions 61, 62, engagement of the chain 8 and the sprocket is relatively smooth and stable.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A chain plate comprising:
two end segments spaced apart from each other in a lengthwise direction, each of said end segments having a rod hole that has a central axis, one of said end segments further having an extension portion extending away from the central axis of said rod hole of said one of said end segments in the lengthwise direction, a first distance from the central axis of said rod hole of said one of said end segments to an edge of said one of said end segments in the lengthwise direction being greater than a second distance from the central axis of said rod hole of said one of said end segments to an edge of said one of said end segments in a widthwise direction; and
an intermediate segment disposed between and connected to said end segments,
wherein said chain plate has an inner surface and an outer surface that are opposite to each other in a thicknesswise direction,
wherein said inner surface has a first inclined region corresponding to a peripheral region of said one of said end segments, and a second inclined region corresponding to said extension portion and between said first inclined region and said rod hole of said one of said end segments, and said first inclined region and said second inclined region are inclined toward said outer surface,
wherein said intermediate segment is formed, at said inner surface, with a recess that is recessed in the thicknesswise direction toward said outer surface and that has two parallel edges extending in the widthwise direction and spaced apart from each other in the lengthwise direction,
wherein each of said end segments has said extension portion,
wherein said inner surface has:
two of said first inclined regions corresponding respectively to the chamfered peripheries of said end segments, and
two of said second inclined regions corresponding respectively to said extension portions and being adjacent respectively to said first inclined regions, each of said second inclined regions being disposed between the corresponding one of said first inclined regions and said rod hole of the corresponding one of said end segments.

2. The chain plate of claim 1, wherein said second inclined region is curved along a periphery of said rod hole of said one of said end segments.

3. The chain plate of claim 1, wherein said second inclined region is in a crescent shape.

4. The chain plate of claim 1, wherein said inner surface further has two third inclined regions that extend in the lengthwise direction and inclined toward said outer surface, that are spaced apart from each other in the widthwise direction, and that are adjacent respectively to two sides of said recess.

5. The chain plate of claim 4, wherein said inner surface further has a planar region disposed between said third inclined regions, defining a bottom of said recess, and having a width in the widthwise direction not greater than two thirds of a diameter of said rod hole.

6. The chain plate of claim 1, wherein each of said end segments including a hole portion formed with the rod hole, and said inner surface further has two circular regions corresponding respectively to said hole portions of said end segments and surrounding said rod holes of said end segments, respectively.

7. The chain plate of claim 1, further comprising:
two protruding rings protruding respectively from said end segments in the thicknesswise direction and surrounding said rod holes of said end segments, respectively.

8. The chain plate of claim 1, wherein a first angle of said first inclined region relative to said outer surface is greater than a second angle of said second inclined region relative to said outer surface.

9. The chain plate of claim 1, wherein a first angle of said first inclined region relative to said outer surface is substantially equal to a second angle of said second inclined region relative to said outer surface.

* * * * *